United States Patent
Brigham

(10) Patent No.: US 7,896,414 B1
(45) Date of Patent: Mar. 1, 2011

(54) MEAT HANDLING HOOK

(76) Inventor: Randy P. Brigham, Laceyville, PA (US)

( * ) Notice: Subject to any disclaimer, the term of this patent is extended or adjusted under 35 U.S.C. 154(b) by 1043 days.

(21) Appl. No.: 11/655,756

(22) Filed: Jan. 19, 2007

Related U.S. Application Data

(60) Provisional application No. 60/760,796, filed on Jan. 19, 2006.

(51) Int. Cl.
*B65G 7/12* (2006.01)
*A01M 31/00* (2006.01)

(52) U.S. Cl. .......................... 294/26; 294/25
(58) Field of Classification Search .......... 294/25, 294/26, 142, 149, 153, 158, 166; 452/152, 452/187–190, 192
See application file for complete search history.

(56) References Cited

U.S. PATENT DOCUMENTS

| | | | |
|---|---|---|---|
| 673,830 A | 5/1901 | Wade | |
| 922,136 A | 5/1909 | Groves | |
| 929,173 A | 7/1909 | Stone | |
| 1,086,636 A | 2/1914 | Anderson | |
| 1,542,503 A | 6/1925 | Haidle | |
| 2,278,610 A | 4/1942 | Brownson et al. | |
| 3,310,331 A | 3/1967 | Michaud | |
| 4,023,844 A * | 5/1977 | Roberts | 294/26 |
| 4,061,387 A | 12/1977 | Lindbergh | |
| 4,364,592 A | 12/1982 | Jackson | |
| 4,487,412 A | 12/1984 | Meeko | |
| 4,660,875 A * | 4/1987 | Ziegler | 294/26 |
| 4,691,465 A | 9/1987 | Dooley | |
| 4,720,279 A | 1/1988 | Fritschen et al. | |
| 4,809,974 A | 3/1989 | Buhr | |
| 5,005,257 A | 4/1991 | Bailey | |
| 5,746,685 A * | 5/1998 | Glaser | 294/25 |
| D429,626 S | 8/2000 | Hearn et al. | |
| 6,146,319 A | 11/2000 | Tarail | |
| D481,287 S | 10/2003 | Crist | |
| 6,849,036 B2 | 2/2005 | Forslid | |

* cited by examiner

*Primary Examiner* — Paul T Chin
(74) *Attorney, Agent, or Firm* — Clinton H. Wilkinson; Charles A. Wilkinson

(57) ABSTRACT

An ergonomic meat hook is provided in which the hook portion is not directed between the fingers of the user and is provided with a safety and rest strap to secure the hook to the user's arm or wrist opposite the hook portion to thereby reduce weight which must be supported by the user's fingers. Such strap is arranged to be quickly detached in an emergency.

20 Claims, 7 Drawing Sheets

MEAT HANDLING HOOK

RELATED APPLICATION

This application takes priority from U.S. Provisional Application No. 60/760,796 filed Jan. 19, 2006.

BACKGROUND OF THE INVENTION

1. Field of the Invention

The present invention relates to meat hooks, and more particularly to a meat hook for use in meatpacking plants, slaughterhouses, butcher shops and the like for handling, grasping, and moving slabs of meat of various sizes.

2. Preliminary Discussion

Hand-held meat hooks are used by a majority of workers in meat packaging facilities today. Such hooks are desirable tools because they extend the reach of the worker a few inches, enable a firm grip to be obtained on slabs of meat, and reduce or minimize the CTD risk factor as well as the chances of cutting one's fingers with a knife, since the worker's fingers are positioned further away from the cutting blade. Slabs of meat may also be slippery due to wetness derived from blood or water, and such hooks aid in properly gripping the meat for further processing. A significant mechanical advantage is also attained by using such hooks.

The conventional meat hook is comprised of a hook portion and a handle portion connected substantially transversely from said hook portion. The handle portion is grasped in the palm and gripped tightly in the worker's fingers, with the hook portion extending forwardly and outwardly from the hand, normally extending between the first and second fingers or the second and third fingers of the hand being used. When the pointed end of the hook is forced into a slab of meat, the handle is grasped tightly so that the hook will not twist due to such force, and so that the weight of the meat is supported on the handle in the hand of a worker. The stiffness of the handler's grasp is aided by the hook extending between the fingers, since the hook is laterally supported by contact with the base of the fingers on each side. The handle may be a general cylindrical configuration or may be shaped with preferably flattened sides or an otherwise molded exterior to improve gripping by the user's hand. This enables the entire hand to be used in a power grip position to hold or secure a slab, and enables the user to provide a better or more efficient pulling force in order to move or turn such slab.

Injuries to the hands as a result of the use of such prior meat hooks, and the reasons for such injuries, are well known and documented. A handle having a rectangular shape concentrates all of the pulling pressure of the hook across a narrow band near the base of the fingers. A handle having a cylindrical shape spreads the pulling force of the hook more evenly across the fingers, but the hard plastic still puts contact stress on the tendons of the hand as they are squeezed against the finger bones. Therefore, circulatory compromise, neuropathy and trigger finger CTD symptoms are likely to develop over time. In use, the hand that is gripping the handle is under constant tension or stress. Injuries and disease processes such as arthritis, carpal tunnel syndrome, and the like are therefore quite common in the meatpacking industry, and have resulted in a large number of health-related claims and absenteeism. Irritation and severe callousing on the fingers between which the stem or shank of the meat hook extends is also not only very common, but endemic. While the need for a more ergonomic or less stressful design meat hook is clearly known, to date no one has up to now developed a device which adequately addresses all of the inadequacies and disadvantages of the conventional meat hook, while incorporating also the practical advantages of the present hook. One improved meat hook handle, which has been used, is the so-called "D" handle in which the curved section of the "D" supports the impaling or slab handling hook itself while the closure of the curved portion of the "D" may be grasped by the hand of the worker. Unfortunately, while this arrangement avoids the passage of the hook shank member between the user's fingers, it allows the handle to rotate adversely in the palm unless gripped very tightly even when a rectangular configuration or surface is provided on the handle.

3. Description of Related Art

The patented prior art with respect to grasping devices in general and meat hooks in particular discloses a wide variety of different arrangements designed to improve the efficiency of the hook and its grasping power. The most relevant of such prior art references known to the present inventor are disclosed and discussed below.

U.S. Pat. No. 6,73,830 issued to L. G. Wade on May 7, 1901, entitled "Lumber Hook," discloses a hook designed for grasping boards in a pile of lumber. The hook is made of metal and has a flat shank with a right-angled prong at its distal end, which prong serves as a hook. A wrist strap enables the user to let go of the hook when it is not in use while still keeping it in a close relationship to the user's body. The Wade hook does not illustrate unique features and advantages of the applicant's meat hook device, however, such as the angled or offset handle frame or quick-release wrist strap.

U.S. Pat. No. 3,922,136 issued to R. J. Groves on May 18, 1909, entitled "Implement for Shocking Grains," discloses a tool having a handle section that is aligned with the shank of the tool and held in the user's palm, a forwardly extending hook section, and a small loop attached to the shank of the hook for receiving the user's forefinger, which loop improves the user's grip on the tool. While Groves broadly discloses a hook and strap combination, the particular advantages of the present inventor's meat hook are not disclosed.

U.S. Pat. No. 9,29,173,136 issued to D. B. Stone on Jul. 27, 1909, entitled "Husking Device," discloses a hook for use in corn husking activities that is secured both to the user's wrist and upper arm, so that the tool does not have to be gripped in the hand by the user during use. However, the wrist and arm straps of the Stone device do not appear to be "quickly releasable" when a certain minimal amount of outside force is exerted.

U.S. Pat. No. 1,086,636 issued to O. C. Anderson on Feb. 10, 1914, entitled "Shocking Hook," discloses a hook for handling bundles of corn and the like having three hook members extending forwardly from a single shank, a gripping handle aligned perpendicular to the longitudinal axis of the shank, and a strap for securing the device to the forearm. While the advantages of the device are not clearly listed, it appears the hook is designed to aid in lifting bundles while reducing the amount of stress on the user's hand and arm in a manner basically generally similar to your the present invention except secured to the forearm rather than the wrist.

U.S. Pat. No. 1,542,503 issued to C. Haidele on Jun. 16, 1925, entitled "Meat Hook," discloses a meat hook having a wooden handle aligned with and surrounding a straight shank portion, and in addition, having an adjustably positionable outwardly protruding trigger member over which one's forefinger is placed during use of the tool, thereby improving the user's grip and gripping power. Such tool still must be gripped in the user's hand at all times during use, however.

U.S. Pat. No. 2,278,610 issued to P. Brownstone et al. on Apr. 7, 1942, entitled "Bundle Picker," discloses a leather gauntlet member that is securable around a user's hand and having a pair of forwardly extending hooks that are thrust into bundles and the like. The Brownstone bundle picker appears to be designed to reduce stress on the hands and fingers that might occur due to lifting the bundles by continually gripping a hook, but has a different construction from the present invention.

U.S. Pat. No. 3,310,331 issued to H. Michaud on Mar. 21, 1967, entitled "Log Hook," discloses a log hook having a handle with flattened lateral faces around which the user's hand is cupped and oriented so that it is perpendicular to the longitudinal axis of the shank. While the shank section of the Michaud hook does not have to extend through or between the user's fingers, the user must maintain a tight grip on the handle at all times, or else the hook will be dropped. This so-called D handle arrangement has been suggested for use in meat hooks.

U.S. Pat. No. 4,061,387 issued to J. M. Lindbergh on Dec. 6, 1977, entitled "Net-Raising Tool," discloses a tool using a modification of a "D" handle for use by fishermen to grasp and raise a fishing net from the sea by the use of several hook members attached to a handle section. A wrist strap is not provided.

U.S. Pat. No. 4,364,592 issued to C. P. Jackson on Dec. 21, 1982, entitled "Multi-Purpose Log Handling Tool," discloses a logging tool having an appearance similar to that of a "conventional" meat hook with a "D" type handle. The hook has an opening on its proximate end in which a closed loop handle is received. The main improvement of such device appears to be that the handle can be adjusted so that it is either rigidly or swivelably secured to the hook, and thus the tool can be easily arranged for either lifting or rolling logs.

U.S. Pat. No. 4,487,412 issued to J. J. Meeko on Dec. 11, 1984, entitled "Weight Lifting Grips," discloses a weight lifting gripping aid including a curved weight engagement. The device includes a wrist strap secured to a semicircular cradle that surrounds a portion of a weightlifting bar, so that the amount of tension on the user's fingers and hands in supporting the wearer or the weightlifting bar is reduced, allowing either a greater amount of weight to be lifted or lifted for a longer period of exercise without having to stop due to tiring of the hand and fingers.

U.S. Pat. No. 4,660,875 issued to F. Ziegler on Apr. 28, 1987, entitled "Hook Construction," discloses a meat hook having a handle section and a strap section. The handle is situated in a C-shaped frame which surrounds the front and sides of the hand when the handle is gripped, and a hook member extends forwardly from the front of the C-shaped frame rather than between the fingers of the user. In addition, a strap member is provided along the rear of the frame, which strap member is placed over the top but not the bottom of the wrist, and thus apparently is not actually secured to the wrist. The strap member is designed to prevent the hook element from rotating upwardly when a downward manual force is applied on the hook by the user. The construction of the hook and handle is different from that of the present inventor's invention. The arrangement is basically a variation of the "D" type handle arrangement.

U.S. Pat. No. 4,691,465 issued to P. D. Dooley on Sep. 8, 1987, entitled "Gaff for Landing Fish," discloses a hook having an elongated shank section and an angled pistol grip style handle member attached extending downwardly and rearwardly from the rear end of the shank. The hook member extends from one side of the handle but does not extend around to the front. A wrist strap is not disclosed.

U.S. Pat. No. 4,720,279 issued to C. L. Fritscheian et al. on Jan. 19, 1988, entitled "Hook Water Sports Hand Grip" discloses a hand grip having a palm strap section designed to fit in the user's palm and having a rib configuration on the finger end of the palm strap section, as well as a finger loop on the same end of the palm strap. The palm strap is also secured around the user's wrist by a wrist strap.

U.S. Pat. No. 4,809,974 issued to T. W. Buhr on Mar. 7, 1989, entitled "Method of Attaching a Wrist to a Bar for Exercising," discloses a strap also for use in securing one's wrist to an exercise bar, with the purpose being to prevent the user's wrist from weakening before the muscles being exercised are fatigued. Such strap includes a Velcro® closure on its ends.

U.S. Pat. No. 5,005,257 issued to R. F. Bailey on Apr. 9, 1991, entitled "Meat Hook," discloses a meat hook having a shank section that is straight for a short section starting from the proximate or handle end, and then is angled upwardly just before the hook section, and also having an upwardly or downwardly vertically extending handle member situated at about a 90° angle with respect to the shank. There is no means for alleviating the requirement to grip the handle tightly at all times such as in the present invention. Furthermore, the handle and therefore, the grip is parallel to the hook rather than perpendicular thereto and thus requires a different hand orientation than with a conventional meat hook.

U.S. Pat. No. 6,146,319 issued to T. Tarail on Nov. 14, 2000, entitled "Exercise Grip," discloses another exercise gripping aid, which is secured to the wrist of the user by a Velcro® releasable strap member.

U.S. Pat. No. 6,849,036 issued to F. Forslid on Feb. 1, 2005, entitled "Gripping Device," discloses another gripping aid for gripping a rounded handgrip, which device is secured to the wrist of a user by a Velcro® releasable strap member. Such strap apparently is not secured around the wrist in the same manner as the strap member of the present inventor's meat hook invention, however.

U.S. Design Patent D429,626 issued to R. C. Hearn et al. on Aug. 22, 2000, entitled "Meat Hook," discloses a meat hook having a handle member connected to the underside of the shank by a rounded frame which surrounds the hand when the handle is grasped. In addition, the shank extends rearwardly past the handle where a rounded padded support is attached, which support contacts the upper side of the wrist and prevents the hook from twisting in the hand of the user when it is pressed downwardly into a slab of meat. While in use the wrist support probably enables the user to maintain a less firm grip on the handle member, the Hearn meat hook does not include a wrist strap and has a different construction from the present inventor's hook.

U.S. Design Patent D481,287 issued to M. O. Crist on Oct. 28, 2003, entitled "Drawknife with Wrist Support," discloses an ornamental design for a drawknife having a blade extending upwardly from a handle member, which member has a rearwardly disposed frame structure with apparently a Velcro® wrist strap attached.

The present inventor's meat hook device is significantly different from, for example, the Ziegler meat hook device and, it is believed, the other known devices either disclosed above or otherwise known to the inventor. First, the wrist strap of the Ziegler device, for example, merely prevents the hook from pivoting when it is forced into a meat product, while the present inventor's strap is secured tightly around the entire wrist, and therefore the user does not have to grip the handle as tightly to pull or move a product, since much of the force that was initially applied only by the hand is now transferred to the wrist. In addition, the frame that surrounds the hand of the Ziegler device makes it harder to remove one's hand from the device quickly, and therefore presents a safety hazard to a user should the hook, frame, or strap become stuck or entangled in a conveyor belt of a meat processing line or the like. Another considerable advantage of the present inventors' hook over the conventional meat hook is that the hook shank is offset where it engages the handle next to the little finger. Thus, there is less rubbing and irritation occurring between the fingers or wear occurring to a protective glove worn over the hand than in the traditional meat hook. In addition, the handle of the present inventor's meat hook cannot entrap the hand, because it is open on the thumb side of the handle, which enables the user to grasp the handle with the thumb at the top of the handle next to the fingers at the end of the handle or wrapped around the handle at any time during use. In addition, the inventor's strap arrangement is attached to the bottom of the handle in a loop fashion at the inside of the wrist and extending around to the back of the wrist. The strap is also attached using hook and loop fasteners, and a pull tab is provided so that the hook and loop fasteners can be very quickly torn apart or opened, and the strap released in the event of an emergency. It is extremely important that a meat hook be readily releasable from the hand in case of emergency, but be securely held during actual use. The present inventor's strap also transfers the force of the hook to the back of the wrist which will allow the user to significantly reduce his grip on the handle portion of the device while pulling on the hook engaged with a slab of meat or the like. Such arrangement significantly reduces the occurrence of carpal tunnel syndrome and so-called trigger finger (because a similar injury reducing the ability to move the finger occurs in those continuously contracting the finger used to operate the trigger of a gun). Furthermore, the present inventor's hook can be lowered to the side of the user where such user can release the grip, totally enabling the user to exercise his or her fingers between use while still allowing the hook to be maintained ready for use. This cannot be accomplished in the Ziegler invention. The user of the present inventor's hook device, for example, can then use both hands and quickly re-grasp the hook to continue its use. The present invention is also inexpensive to manufacture and therefore can be mass-produced in a cost-effective manner.

OBJECTS OF THE INVENTION

It is therefore a primary object of the present invention to provide a meat hook that can be used by workers in packaging plants and the like for significantly longer periods of time without any discomfort being experienced by the user.

It is a further object of the present invention to provide a meat hook that significantly reduces the occurrence of carpal tunnel syndrome and trigger finger in the hands of meat packers and the like.

It is a still further object of the present invention to provide a meat hook having a wrist strap means wherein during use a large percentage of the pulling force required in using the hook is transferred from the handle portion of the hook to the user's wrist via such wrist strap.

It is a still further object of the present invention to provide a meat hook device having a wrist strap that can be easily and quickly removed or detached by a worker in the event of an emergency.

It is a still further object of the present invention to provide a meat hook having a wrist strap further comprising a pull away tab to facilitate quick removal.

It is a still further object of the present invention to provide a meat hook wherein the amount of movement of the hook in the hands of the user is significantly reduced, and the occurrence of irritation between the user's fingers caused by the hook shank is eliminated and the amount of wear that occurs on protective clothing worn by such user is drastically reduced.

It is a still further object of the invention to provide a meat hook wherein the hook shank exits from one side of the handle and curves around to a position in front of any fingers gripping the handle with the hook inclined substantially in a plane parallel to the fingers curved about the handle.

It is a still further object of the invention to provide a meat hook having the hook shank embedded within a molded plastic handle such shank extending through the plastic at diverse angles and passing from one end of the handle where it curves back to a position in front of the handle opposite a hand gripping the handle adjacent one end and curving back upon and reentering the other end of the handle to form an attachment means for a wrist strap.

It is a still further object of the invention to provide a hook having a continuous shank passing at diverse angles through a molded or stamped plastic handle and extending from said handle to form a transverse hook on one side and a curved wrist strap attachment means at the other side.

Still other objects and advantages of the invention will become clear upon review of the following detailed description in conjunction with the appended drawings.

SUMMARY OF THE INVENTION

The present invention is directed to an ergonomic hand held hook for handling heavy loads quickly and efficiently without undue strain or injury to the handler and is particularly useful for use as a so-called "meat hook". The hook is provided with an offset mounting or support frame preferably as a unitary extension of the hook structure itself, which frame extends through the handle, which may be formed of plastic and extends from the handle opposite the hook to provide an attachment for a wrist strap including a quick disconnect feature for safety. The offset mounting of the hook allows the hook itself to be centered over the fingers of the user's hand clenched over the handle of the hook so the hook does not extend between the fingers of the user's hand even though centered over the hand.

DESCRIPTION OF THE PREFERRED EMBODIMENTS

Figure 1:
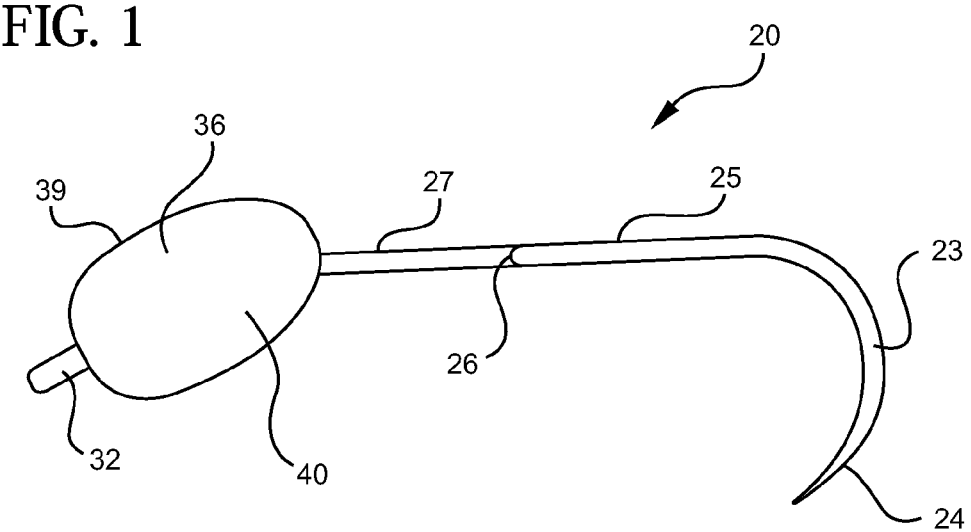
FIG. 1 is an end elevation view from the side of the meat hook device of the present invention with the wrist strap removed.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

As indicated above, a number of variations and improvements upon the traditional meat hook have been devised in the past, but none has been completely satisfactory. While the traditional meat hook having the hook extending from the middle of a transverse handle, particularly where the handle is flattened to allow a firm grip, is effective, efficient and inexpensive, it is medically and ergonomically undesirable because the user's hand becomes excessively fatigued over long periods of use such as, for example, the length of the usual shift in a meat packing plant or the like and because the traditional extension of the hook between the central or middle fingers of the hand to provide both balance and additional stability of the hook in the user's hand when handling heavy slabs of meat, over fairly short periods of use causes either sores and actual ulcers between the fingers or heavy calluses of the skin between the fingers, or both. The invention of the so-called "D" handle for the hook, such "D" arrangement being of various constructions, and wherein the hook extends from an arcuate structure extending from one side of the handle to the other, sometimes in the form of a flattened shroud or shield, removed the hook from between the fingers, thus solving the problem of sores and calluses, but also removed the stabilizing influence of the hook extending between the fingers and the stress of use, and particularly the stress of having the fingers curled tightly about the handle for long periods, remains. Consequently, stress related medical problems with respect to the hand also remain with the "D" design of such hooks. There have been other developments attempting to alleviate various problems of meat hooks, but none has been particularly successful and meat packer's hand problems have remained and even intensified. In short, there has been no ergonomically successful and efficient substitute for the traditional meat hook and large numbers of the traditional design meat hooks remain in use.

The present inventor, who has had considerable contact with and experience with the problems common with meat hooks in the packing industry, has studied the problems encountered and has now devised the ergonomically improved meat hook of the invention, which is both efficient in eliminating or at least very considerably alleviating the problems previously inherent in the traditional meat hook structure and effective in handling slabs of meat and the like. In solving such problems, the inventor has provided a meat hook extending from a bent shank or hook support frame contained within a molded handle similar to the handle of a conventional handled meat hook, but with the centrally positioned hook structure mounted upon a portion of the shank or hook support frame extending from one end of the handle and curving around outside or outboard of the fingers of the user to the base of the hook structure itself. The hook itself is more or less conventional. Meanwhile, the shank or hook support frame extending through the handle extends from a position near one end of the back or bottom of the handle and curves around preferably at an angle with the base of the hook, but oriented at an angle with respect to the hook, but essentially in line with the wider dimension of the handle and preferably reenters the molded handle for a short distance forming overall a loop at the rear of the handle upon which is mounted during use a quick detachable strap preferably with hook and loop fastening portions which can be wrapped about or attached to the wrist of the user with a short unattached end which can be easily grasped by the user with his or her other hand and quickly detached in an emergency such as where the hook may be caught in something and the user wishes to quickly disengage him or herself from it.

The strap aids in holding the hook in the hand by tying one end to the wrist of the user, enabling the user to grasp the handle less tightly during use and in addition allowing the user, when the hook is not actually in a slab of meat or the like, to straighten, or partially straighten his or her fingers to various degrees without laying the meat hook down or hanging it on something, but rather keeping it immediately available for use. Being able to straighten or flex the fingers (plus actually doing so) alleviates long term cramping and loss of flexibility that would otherwise occur in the fingers.

Figure 2:
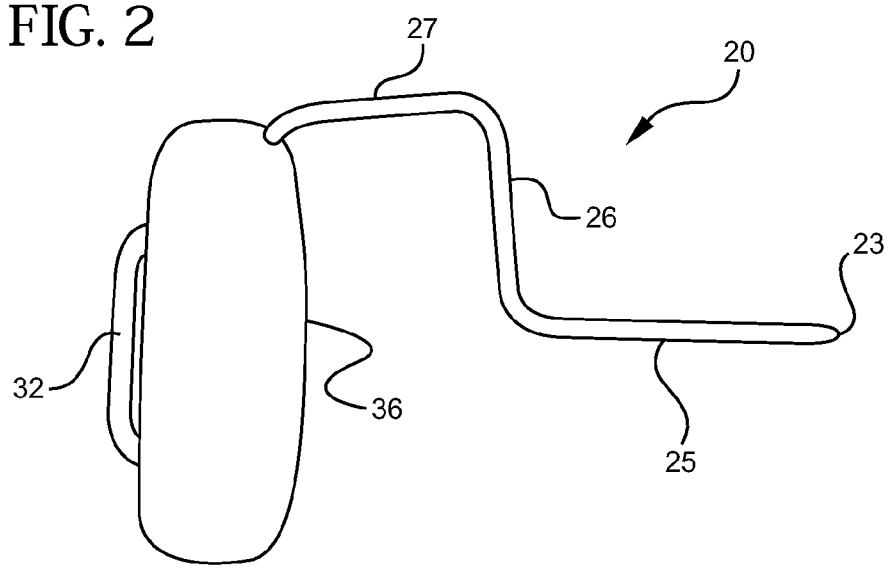
FIG. 2 is a top view of the meat hook device of the present invention at right angles to that shown in FIG. 1.
Figure 3:
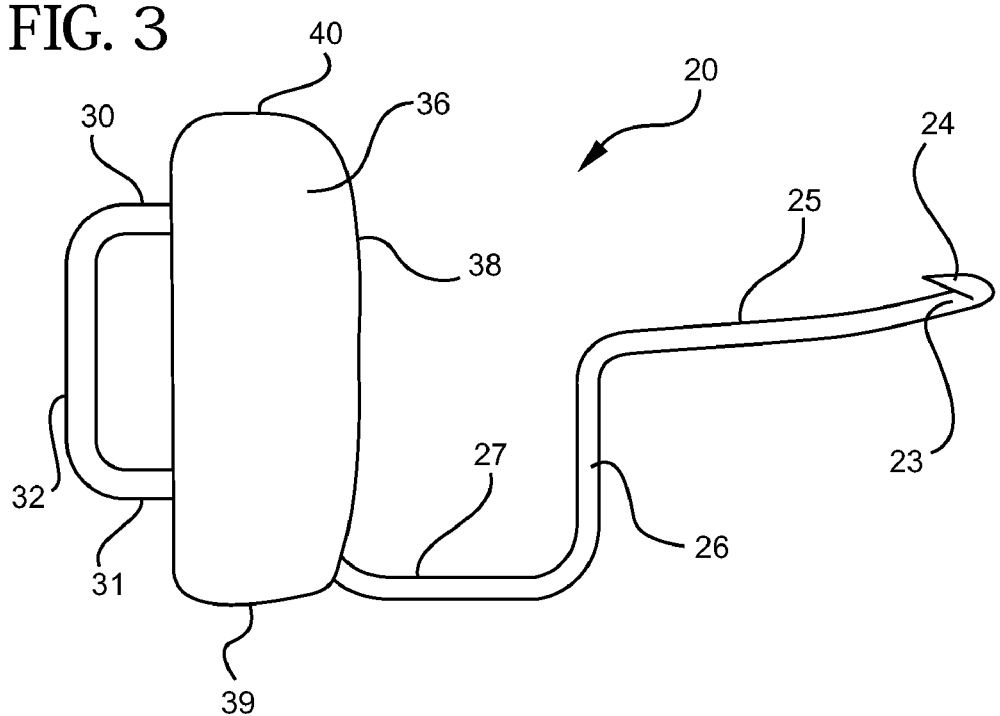
FIG. 3 is a bottom view of the meat hook device of the present invention opposite to that shown in FIG. 2.
Figure 4:
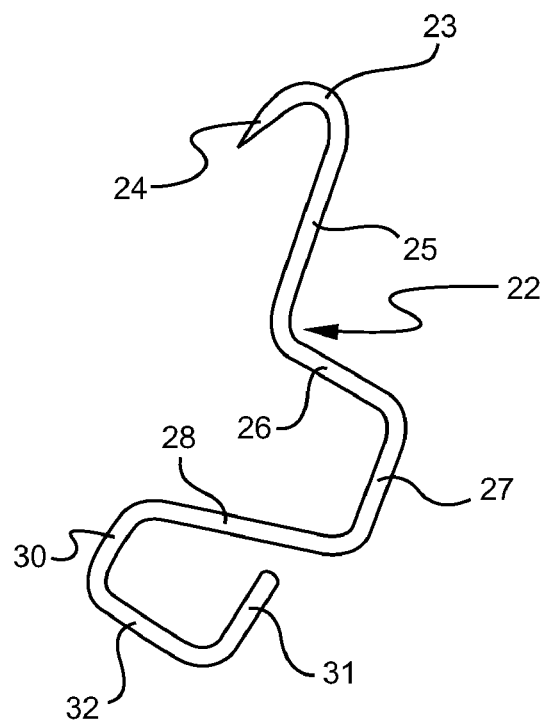
FIG. 4 is a perspective view of the meat hook device of the present invention with the molded handle and wrist strap removed from the respective shank and strap tie portions.
Figure 13:
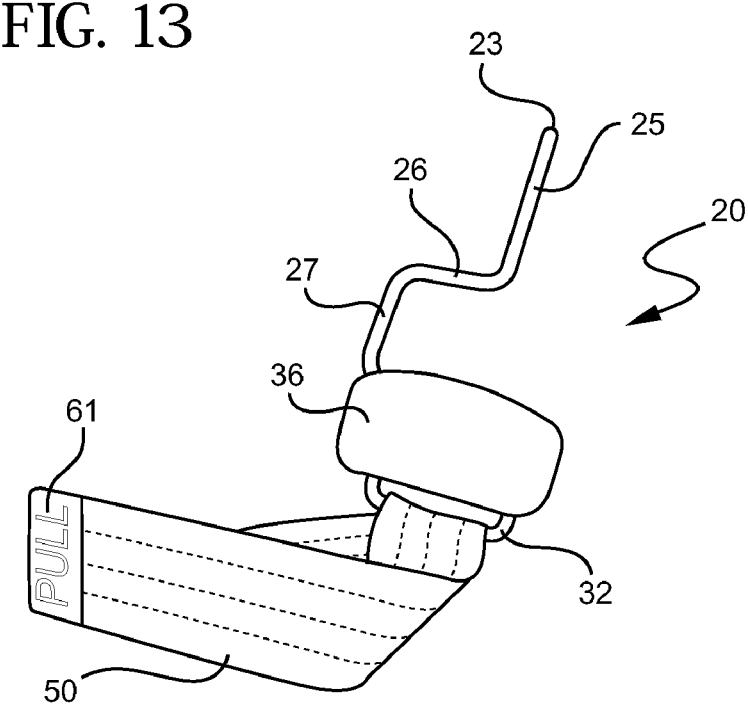
FIG. 13 is a perspective view from the top of the meat hook device of the present invention with the strap disengaged from any user.
Figure 14:
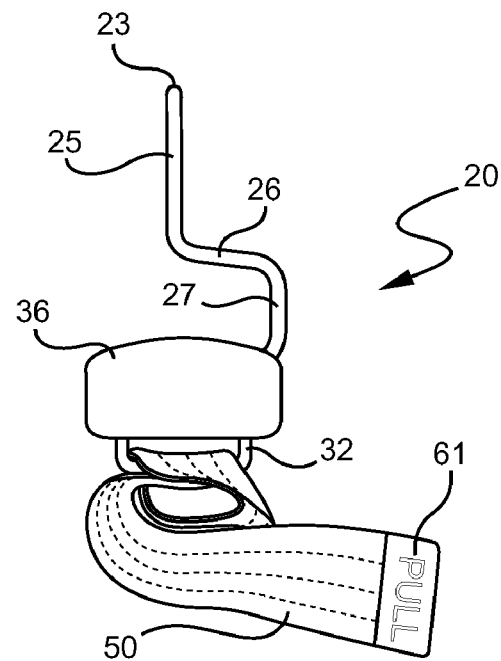
FIG. 14 is a perspective view from the bottom of the meat hook device of the present invention with the strap disengaged.

FIGS. 1-14 illustrate a preferred embodiment of the meat hook device of the present invention. FIGS. 1, 2, and 3 are side, top, and bottom views of the meat hook 20 of the present invention with the wrist strap 50 (shown in FIGS. 5-6) detached, FIG. 4 illustrates the hook and hook support portion 22 of the meat hook 20 with both the gripping handle and wrist strap detached or not yet applied, FIGS. 7-12 illustrate several views of the meat hook device 20 in the hand of a user, while FIGS. 13-14 are top and bottom perspective views of the meat hook device 20.

Hook section 22 comprises preferably a continuous elongated solid metal rod or cylinder formed to include a curved end or hook section 23 having an end point 24. Curved end or hook section 23 is connected to one end of straight upper shank section 25 of hook support, while the other end of upper shank section 25 of hook support 22 is connected to laterally extending shank section 26. Laterally extending shank section 26 is connected at its other end to lower shank section 27, which section 27 is substantially in parallel with upper shank section 25. Shank sections 25, 26, and 27, as is evident in FIG. 4, are all in substantially the same plane, with curved end of hook section 23 extending downwardly from upper shank section 25. Referring particularly now to FIG. 4, connected to the rearward end of lower shank section 27 is handle support section 28. Handle support section 28 is preferably aligned at approximately a 100-140 degree angle with respect to lower shank section 27, and in addition, as best shown in FIG. 1, is angled downwardly at an angle of approximately 25 degrees from the plane of shank sections 25, 26, and 27. A loop to which the wrist strap is connected as described below is formed on the other end of handle support section 28 via side sections 30 and 31 which are joined together by bottom section 32.

Once overall hook section 22 has been formed as described by any suitable machinery or tools, handle or gripping member 36, preferably made of plastic, is secured over handle support section 28 and preferably a portion of section 30 of such hook. Handle 36 is preferably made of a polymer or plastic approved for use with food such as polyethylene or polypropylene and is molded directly around handle section 28, as well as around the upper ends of side sections 30 and 31. Handle 36 preferably has a relatively smooth surface with a rounded top side 38 forming a double frustum. As a result of such configuration, lower shank section 27 of hook 22 is offset to one side from upper shank section 25, while in addition, upper shank section 25 is aligned more or less with the center of handle or gripping member 36, although shank 25 may be offset slightly to one side or the other of handle member 36 if desired, or may be aligned substantially in front of the first and second or second and third fingers as desired. The double frustum configuration of the top or front of the handle aids in aligning the hook in a central position in front of the user's hand. In addition, as indicated above, while shanks 25, 26, and 27 are in substantially the same plane, handle support section 28, and as a result also first and second side faces 39 and 40 of handle or gripping member 36, as well as the loop formed by side and bottom sections 30-32, are bent at about a 25 degree downward angle with respect to shanks 25-27. Such angle is important in that it compensates for a substantial amount of the movement or rotation of the wrist when the hook is thrust downwardly or otherwise forced into a slab of meat or other surface.

Figure 5:
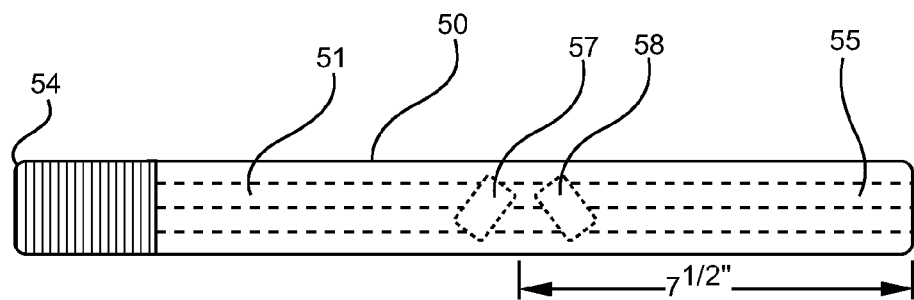
FIG. 5 is a view of the outer side of the wrist strap used with the meat hook device of the present invention.
Figure 6:
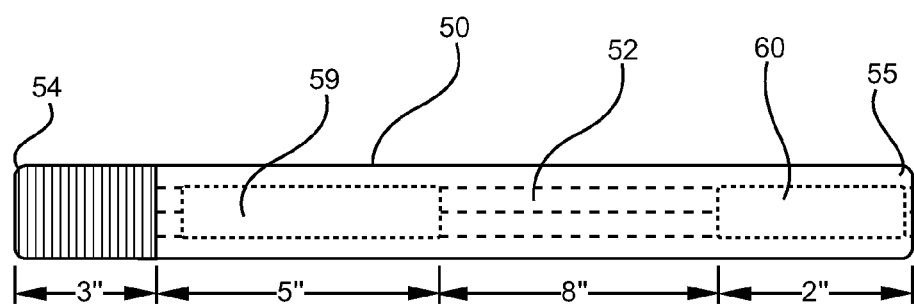
FIG. 6 is a view of the inner side of the wrist strap used with the meat hook device of the present invention.
Figure 7:
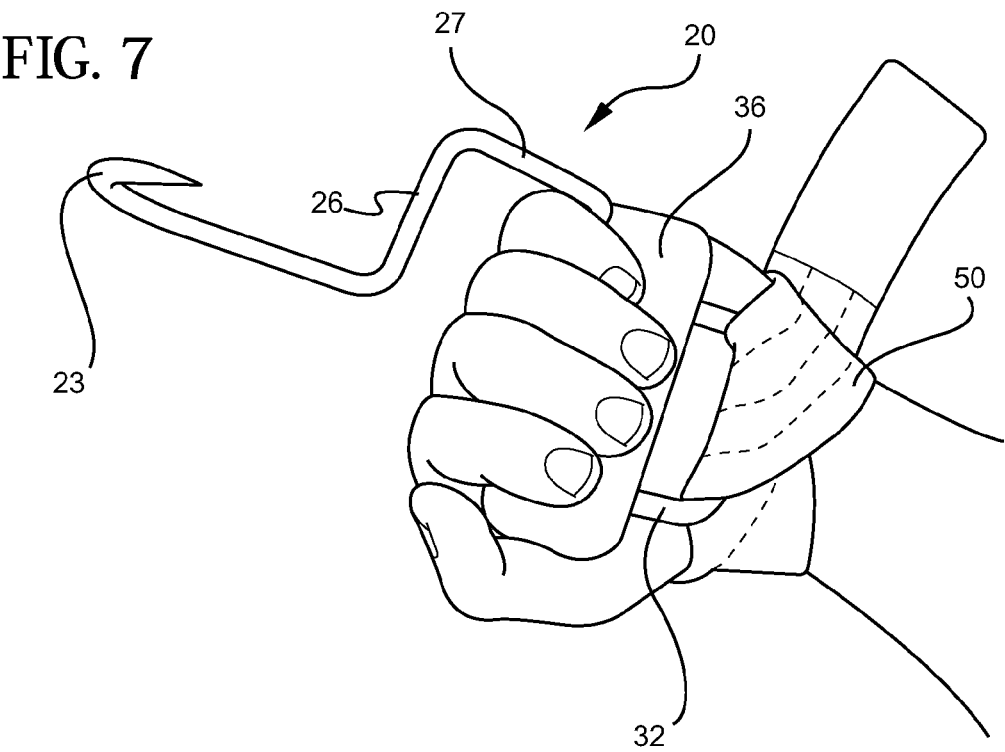
FIG. 7 is a perspective view from the bottom of the meat hook device of the present invention in the hand of a user.
Figure 8:
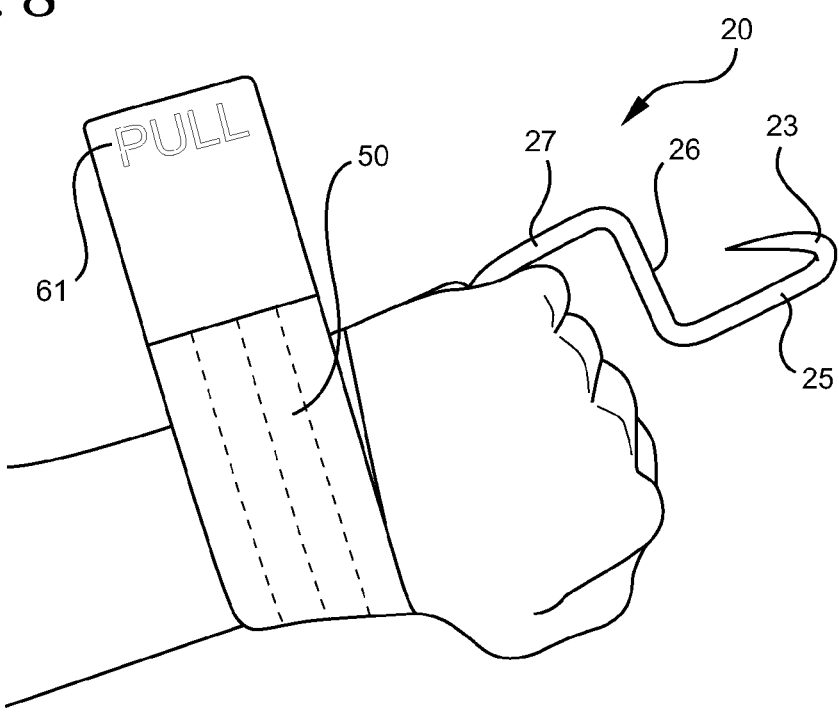
FIG. 8 is a perspective view from the top of the meat hook device of the present invention grasped in the hand of a user and secured by the strap element about the wrist.
Figure 9:
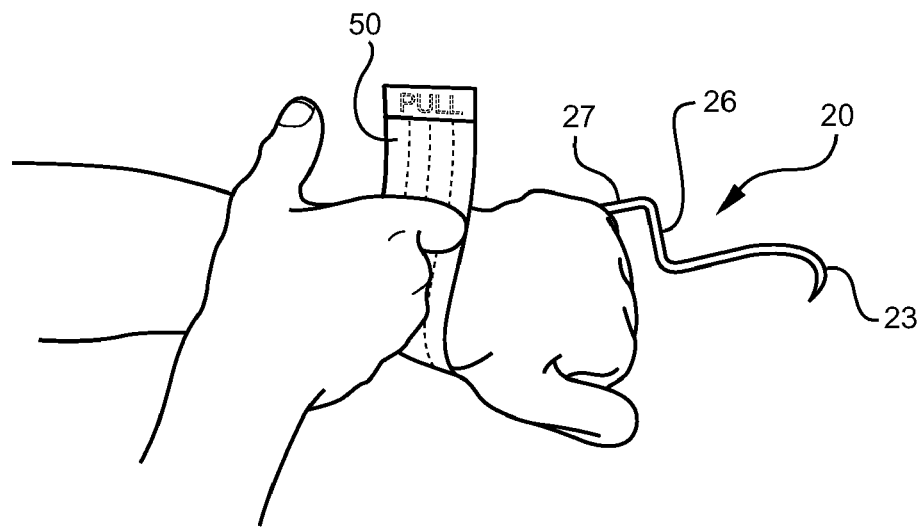
FIG. 9 is a perspective view showing the meat hook device of the present invention being secured by its strap means over a protective glove to the hand and wrist of a user.

FIGS. 5 and 6 illustrate the outer and inner sides, respectively, of wrist strap 50 (see also FIGS. 7 and 8). While strap 50 may be of varying types, a preferred strap arrangement is disclosed in U.S. Pat. No. 4,487,412 issued to Joseph J. Meeko on Dec. 11, 1984, entitled "Weight Lifting Grips", the entirety of which patent is hereby incorporated by reference with respect to the strap disclosed therein. Strap 50 is made of a suitable material such as a strong nylon or cotton webbing, and in the embodiment shown has a length L of approximately 18 inches and a width of approximately 2 inches. As is best illustrated in FIG. 5, wherein the top side 51 of strap 50 is facing upwardly, such strap 50 has a first end 54 and a second end 55. Situated side-by-side at a position slightly offset from the midpoint of strap 50, preferably slightly nearer to second end 55, and with their bottom edges preferably also angled towards second end 55 when overlapped or secured together, are first and second cooperating hook and loop fastener members 57 and 58. Such fastener members 57 and 58, as described below, are used to secure strap 50 around bottom section 32 of hook 20. In addition, as shown in FIG. 6, a second pair of cooperating hook and loop fastener members 59 and 60 are attached to bottom side 52 of strap 50, spaced apart approximately 8 inches from one another. While the exact dimensions and distance apart of hook and loop fasteners 59 and 60 are variable, the fasteners should be adequately positioned to secure strap 50 around a user's wrist in the manner described below, and to allow for some adjustment of strap 50 when it is secured to such a user's wrist. Note also that first end 54 of strap 50 is preferably brightly colored such as with a paint or other covering, and preferably red in color, plus the wording "PULL" 61 is preferably clearly indicated on top side 51 in large letters (see FIGS. 8, 9, 13 and 14). This coloring and wording on first end 54 of strap 50 serves as an emergency pull or release reminder for someone having the meat hook device secured to his or her hand and wrist, as will be now be described.

As best shown in FIGS. 7-8 and 2-14, strap 50 is looped over bottom section 32 of the steel loop formed in hook 20, with top side 51 facing downwardly and abutting bottom section 32 and positioned between angled and cooperating hook and loop fasteners 57 and 58. Fasteners 57 and 58 are then brought into abutting contact, thereby releasably securing strap 50 to hook 20. Referring now to FIGS. 7 and 8, device 20 is then grasped by the user with the hook point 24 facing forwardly and downwardly in front of the user's fingers, and with handle or gripping member 36 positioned in the palm area of the user's hand and the loop holding strap 50 in place adjacent the inner side of the user's wrist or heel of the hand. Then, second end 55 of strap 50 is looped over the top of the wrist so that second side 52 and fastener 60 are facing upwardly. First end 54 of strap 50 is then looped around the opposite side of the wrist with first side 51 and fastener 59 facing downwardly, after which cooperating fasteners 59 and 60 are brought into abutting contact. In such position, as best shown in FIG. 8, first end 54 of strap 50 with brightly colored end and lettering 61 is facing upwardly and loosely extending to one side of the device.

In final operating or working position, the strap 50 is secured around the wrist of the user wrapping the first end upwardly and then over the top of the wrist, and then wrapping the other end of the strap over the other side and then over the top of the first strap, so that cooperating hook and loop fastener sections 59 and 60 are in contact and are holding the strap around the user's wrist.

Figure 10:
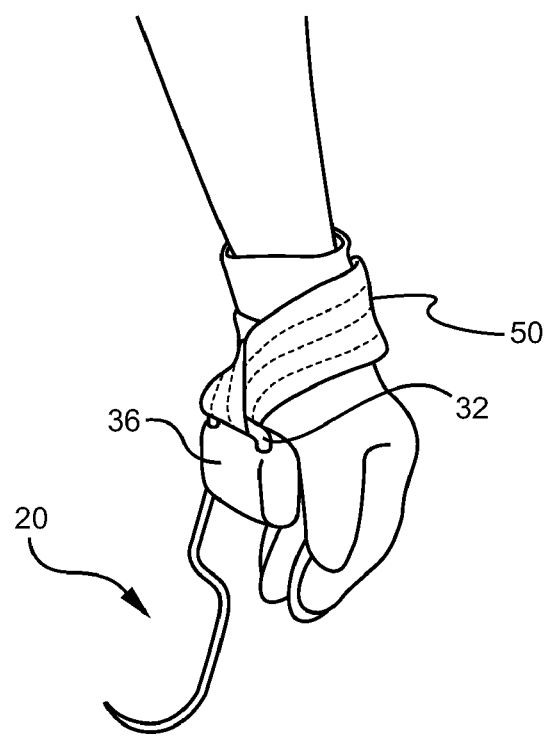
FIG. 10 is a perspective view showing the meat hook device of the present invention secured over a protective glove to the hand and wrist of a user with the user's fingers in a relaxed, non-gripping position with respect to the handle.
Figure 11:
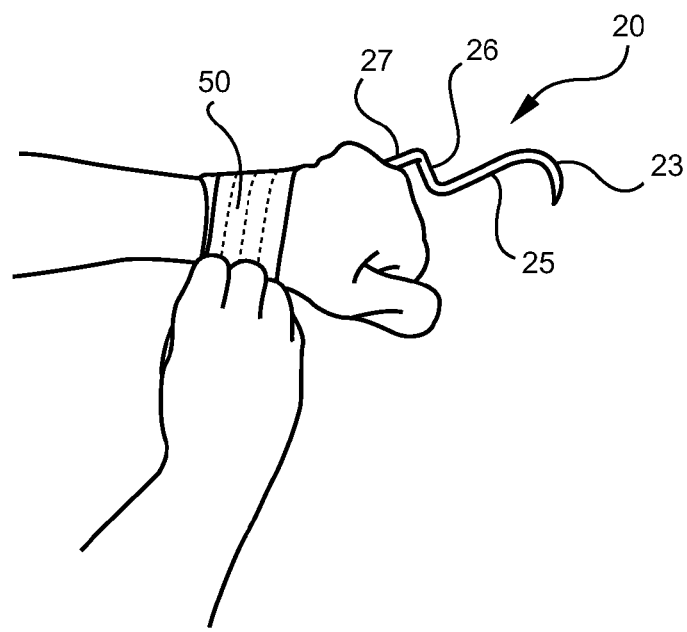
FIG. 11 is a perspective view showing the pull tab on the wrist strap being pulled to release the hook and loop fasteners of the wrist strap of the invention.
Figure 12:
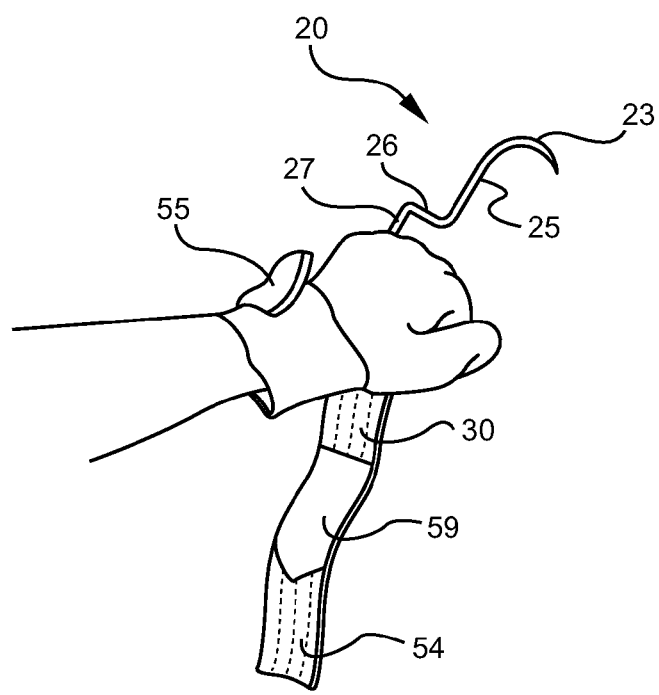
FIG. 12 illustrates the meat hook device of the invention with the hook and loop fasteners of the wrist strap of the invention after it has been released.

The advantages of the present inventor's meat hook device over prior art devices are numerous. First, as shown in FIGS. 7 and 8, the shank portion of hook 20 does not extend between and irritate the user's fingers, or where a protective glove is worn, cause an inordinate amount of wear on the glove in such area. Instead, the hook shank is offset at lower section 27 where it engages the handle member 36, but the curved pointed end 24 of hook 20 is still positioned centrally in front of the top section 38 of handle member 36, so that the device is still nicely balanced and a rearward pulling force on the handle with the hook engaging a slab of meat or the like will not cause the handle to attempt to twist in the user's hand. Strap 50, which is tightly secured around the user's wrist, transfers the force exerted on the hook to the back of the wrist, which will allow users to significantly reduce the amount of gripping force required on handle 36 when pulling on hook 20. Since the constant gripping force on handle 36 is reduced, the number of injuries caused by such constant gripping force, such as carpal tunnel syndrome and trigger finger, will also be very substantially reduced. In addition, as shown in FIG. 10, the device may be lowered to the side of the user with one's grip on the handle being totally released between uses of the hook, without the hook actually being put down and possibly becoming lost or damaged. This will also give the user a further chance to exercise, and/or rest his or her fingers. Furthermore, while the wrist strap 50 securely connects the device 20 to the user's hand and wrist, the arrangement of pull tab 61 ensures that the device and wrist strap are not entrapping. The thumb side of the handle is not blocked by offset lower shank section 27, and in addition, as demonstrated in FIGS. 11 and 12, pulling upwardly and rearwardly on pull-tab 61 will cause the hook and loop fasteners 59 and 60 to quickly and easily release the strap from around the wrist of the user. Furthermore, the pulling force of cooperating hook and loop fasteners 59 and 60 is such that if the device 20 does in fact become entangled in a dangerous situation such as to a conveyor belt, leading to a meat cutting machine or the like, the strap will automatically be released or torn off from the users wrist, thereby providing an alert or even startled user time to pull his or her hand away from the device 20 before injury or damage can occur.

As will be evident, the hook of the invention has at least at present its greatest intended use in the handling of heavy slabs of meat, for example, in coolers and the like. However, it will be evident that the design and principles of the invention can be applied for use in any hand operation where hand held hooks may be used to secure a hold upon large unwieldy packages or bundles with consequent strain and possible injury to the hands and arms of the same. Once the hook of the invention is taken in the hand and the strap secured, the use of the hook is exactly the same as in use of a conventional meat hook except with respect to occasionally loosening or straightening out the fingers.

As will be evident from the above, the hook and shank of the hook including the section within the molded or otherwise formed handle can be formed in any suitable way by the usual bending tools or machinery and the handle can likewise be formed or molded in any suitable manner such as integrally molding over the shank portion of the hook or forming in two halve with appropriate frame structure accommodating grooves and securing over the shank. The invention provides the simple, yet ergonomically and medically effective meat hook for which the industry has been waiting.

While the present invention has been described at some length and with some particularly with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An ergonomic handheld hook for aiding the user to quickly and efficiently secure a hold upon and move a substantial object comprising:
   (a) a hook support frame having at least three sides;
   (b) a hook section at a first side of the frame;
   (c) a strap attachment section disposed at a second side of the frame opposite the first side;
   (d) a frame section intermediate of the first and second sides of the frame including an upper shank section, a lower shank section substantially in parallel with said upper shank section, and a shank section intermediate of said upper and lower shank sections which extends laterally with respect to the hook section; and
   (e) a unitary handle section connected to the lower shank section and positioned transverse to and opposite the hook section, and intermediate the laterally extending shank section and the strap attachment section.

2. An ergonomic hook in accordance with claim 1 additionally comprising a straps adapted for looping about the wrist of a user of the hook and securable to the strap attachment section of the hook.

3. An ergonomic hook in accordance with claim 2 in which the strap is provided with securing tab means for securing said strap to the strap attachment section.

4. An ergonomic hook in accordance with claim 3 in which the strap additionally comprises a quick release arrangement.

5. An ergonomic hook in accordance with claim 4 in which the quick release arrangement of the strap comprises a press-type securation with an easily grasped end extending to an easily reached area of the user's wrist.

6. An ergonomic hook in accordance with claim 1 wherein the hook is adapted as a meat handling hook.

7. An ergonomic hook in accordance with claim 6 wherein the handle is formed of a food handling approved plastic.

8. An ergonomic hook in accordance with claim 1 in which the handle section is angled at approximately twenty-five degrees with respect to the plane of the frame section.

9. An ergonomic hook in accordance with claim 1 in which the hook support frame within the handle extends into the handle from one side of such handle opposite the hook section, turns at nearly a right angle away from the hook section and progresses to the exterior of the handle to form the strap attachment section and then turns at approximately a right angle to reenter the handle.

10. A combined support frame and hook for use in forming a hand tool in the nature of a hook for attachment to and movement of bulky and unhandy loads comprising:
    (a) a unitary elongated thin metal rod material having a conformation including:
        (i) a central section in the form generally of a loop configuration having three closed sides plus one open side,
        (ii) an extension laterally from one side of the central section having its end looped back and sharpened in the form of a hook,
        (iii) an extension laterally from the opposite side of the central section configured in the form of at least a partial loop,
    (b) such conformation of thin metal rod being useful for formation of a hand tool for piercing attachment to an otherwise difficult to grasp and move object, but into which a sharp end may be readily inserted.

11. A combined support frame and hook in accordance with claim 10 additionally comprising:
    (c) a polymeric plastic handle section molded to fit over a portion of the central section as well as a portion of the extension configured in the form of a loop and together therewith forming an operative hook for handling bulky easily pierced objects.

12. A combined support frame and hook in accordance with claim 11 in which the extension laterally from the central section configured in the form of a loop is in the form of a substantially at least partially rectangular loop.

13. A combined support frame aid hook in accordance with claim 12 wherein the portion of the polymeric handle is formed of a polymeric composition approved for use around foods to adapt the hook for use as a meat hook.

14. A combined support frame and hook in accordance with claim 13 wherein the front of the molded handle section has a general double frustum configuration.

15. A combined support frame and hook in accordance with claim 12 in which the extension laterally from the opposite side of the central section at least partially reenters the side of the polymeric plastic handle section.

16. A combined support frame and hook of claim 11 additionally comprising a retention strap passing through the extension laterally from the opposite side of the central section.

17. A combined support frame and hook in accordance with claim 16 wherein the retention strap is provided on one side with closely spaced loop and hook fastenings to enable the strap to be removably secured to the extension laterally from the opposite side of the central section.

18. A combined support frame and hook in accordance with claim 17 wherein the opposite side of the straps is provided with hook and loop fastenings adapted to secure around the arm of a user.

19. A combined support frame and hook in accordance with claim 18 wherein when the hook and loop fastenings on the opposite side of the strap are fastened, one end of the strap is left extending beyond such fastening area and is appropriately marked to indicate it can be grasped and pulled to release the hook and loop fastening to quickly discard the hook from the hand of the user.

20. A combined support frame and hook in accordance with claim 11 in which the section of said rod supporting said polymeric handle is angled at approximately twenty-five degrees with respect to the remainder of said central section.

\* \* \* \* \*

UNITED STATES PATENT AND TRADEMARK OFFICE
CERTIFICATE OF CORRECTION

| | | |
|---|---|---|
| PATENT NO. | : 7,896,414 B1 | Page 1 of 1 |
| APPLICATION NO. | : 11/655756 | |
| DATED | : March 1, 2011 | |
| INVENTOR(S) | : Brigham | |

It is certified that error appears in the above-identified patent and that said Letters Patent is hereby corrected as shown below:

Column 2, line 19, change "6,73,830" to read as -- 673,830 --
Column 2, line 29, change "3,922,136" to read as -- 922,136 --
Column 2, line 38, change "9,29,173,136" to read as -- 929,173
Column 2, line 55, delete "basically" and "your"
Column 2, line 57, change "Haidele" to read as -- Haidle --
Column 2, line 65, change "Brownstone" to read as -- Brownson --

Column 3, line 2, change "Brownstone" to read as -- Brownson --
Column 3, line 65, change "Fritscheian" to read as -- Fritschen --

Column 10, line 4, change "2-14" to read as -- 12-14 --

Column 11, line 53, change "intermediate the" to read as -- intermediate of the --
Column 11, line 56, change "straps" to read as -- strap --

Column 12, line 65, change "straps" to read as -- strap --

Signed and Sealed this
Seventh Day of June, 2011

David J. Kappos
*Director of the United States Patent and Trademark Office*